(12) United States Patent
Buffett-Kennedy (10) Patent No.: US 12,244,974 B1
(45) Date of Patent: Mar. 4, 2025

(54) VEHICULAR PROJECTION SYSTEM

(71) Applicant: Noah Buffett-Kennedy, Omaha, NE (US)

(72) Inventor: Noah Buffett-Kennedy, Omaha, NE (US)

( * ) Notice: Subject to any disclaimer, the term of this patent is extended or adjusted under 35 U.S.C. 154(b) by 0 days.

(21) Appl. No.: 18/095,850

(22) Filed: Jan. 11, 2023

Related U.S. Application Data (60) Provisional application No. 63/298,374, filed on Jan. 11, 2022.

(51) Int. Cl.
| | | |
|---|---|---|
| *H04N 9/31* | (2006.01) | |
| *B60W 60/00* | (2020.01) | |
| *G01S 13/89* | (2006.01) | |
| *G01S 17/89* | (2020.01) | |
| *G01S 19/14* | (2010.01) | |

(52) U.S. Cl.
CPC ............ *H04N 9/31* (2013.01); *B60W 60/001* (2020.02); *G01S 13/89* (2013.01); *G01S 17/89* (2013.01); *G01S 19/14* (2013.01)

(58) Field of Classification Search
CPC ........ H04N 9/31; B60W 60/001; G01S 13/89; G01S 17/89; G01S 19/14
See application file for complete search history.

(56) References Cited

U.S. PATENT DOCUMENTS

| | | | | |
|---|---|---|---|---|
| 4,439,157 A * | 3/1984 | Breglia | ............ | G02B 27/0172 |
| | | | | 359/618 |
| 6,543,899 B2 * | 4/2003 | Covannon | ............ | G02B 27/017 |
| | | | | 353/11 |
| 6,652,104 B2 * | 11/2003 | Nishida | ................ | H04N 9/3185 |
| | | | | 353/69 |
| 6,877,863 B2 * | 4/2005 | Wood | ................... | H04N 9/3185 |
| | | | | 353/42 |
| 7,070,283 B2 * | 7/2006 | Akutsu | ..................... | H04N 5/74 |
| | | | | 353/30 |
| 7,119,965 B1 * | 10/2006 | Rolland | ............. | G02B 27/0172 |
| | | | | 359/630 |
| 7,182,466 B2 * | 2/2007 | Sunaga | ..................... | H04N 5/74 |
| | | | | 353/69 |
| 7,270,421 B2 * | 9/2007 | Shinozaki | ............ | G03B 21/142 |
| | | | | 353/121 |
| 7,359,575 B2 * | 4/2008 | Bassi | ........................ | G06T 3/18 |
| | | | | 345/427 |
| 7,441,906 B1 * | 10/2008 | Wang | ..................... | G03B 21/14 |
| | | | | 353/121 |
| 7,782,387 B2 * | 8/2010 | Azuma | ................ | H04N 23/635 |
| | | | | 359/662 |
| 8,676,427 B1 * | 3/2014 | Ferguson | ............. | G08G 1/0965 |
| | | | | 701/23 |

(Continued)

*Primary Examiner* — Michael B. Pierorazio
(74) *Attorney, Agent, or Firm* — Suiter Swantz IP (57) ABSTRACT

A vehicular projection system is disclosed. The projection system may include a projector that is operatively connected to a vehicle, where the operation of the projector is facilitated by utilizing sensors operatively connected to the vehicle. In embodiments, the vehicle is powered by one or more rechargeable batteries and is equipped with numerous sensors. The sensors continually retrieve data from the area surrounding the vehicle and share collected data with a computer system associated with the vehicle. The computer system processes the data creating directions for the automotive controls of the vehicle which transport the vehicle to an appropriate location.

11 Claims, 7 Drawing Sheets

100 - Projector
200 - Vehicle
310 - Camera
320 - RADAR
330 - LIDAR
340 - GPS
350 - Ultrasonic Sensors
360 - Infrared Sensors 410 - Computer
420 - GUI Interface
430 - Projector Control Module
440 - Driving Control Module
450 - Sensor Control Module 500 - Battery (56) References Cited

U.S. PATENT DOCUMENTS

| | | | |
|---|---|---|---|
| 9,753,126 B2* | 9/2017 | Smits | G01S 17/003 |
| 9,810,913 B2* | 11/2017 | Smits | G02B 5/124 |
| 10,067,230 B2* | 9/2018 | Smits | G01S 17/86 |
| 10,261,183 B2* | 4/2019 | Smits | G01S 7/4868 |
| 10,379,220 B1* | 8/2019 | Smits | G01S 7/4811 |
| 10,394,112 B2* | 8/2019 | Johnson | A01M 1/223 |
| 10,473,921 B2* | 11/2019 | Smits | G01S 17/87 |
| 10,591,605 B2* | 3/2020 | Smits | G01C 21/3626 |
| 10,663,626 B2* | 5/2020 | Benitez | G02B 27/01 |
| 11,830,455 B2* | 11/2023 | Schriever | G06F 3/16 |
| 2002/0051095 A1* | 5/2002 | Su | H04N 9/3194 348/745 |
| 2002/0067466 A1* | 6/2002 | Covannon | G02B 30/26 353/8 |
| 2002/0122161 A1* | 9/2002 | Nishida | H04N 9/3194 353/70 |
| 2003/0191836 A1* | 10/2003 | Murtha | H04L 67/02 709/224 |
| 2003/0210381 A1* | 11/2003 | Itaki | H04N 5/74 353/70 |
| 2004/0156024 A1* | 8/2004 | Matsuda | H04N 9/3185 353/70 |
| 2005/0046803 A1* | 3/2005 | Akutsu | H04N 5/74 353/69 |
| 2005/0073661 A1* | 4/2005 | Tamura | H04N 9/3194 353/70 |
| 2005/0151934 A1* | 7/2005 | Akutsu | G03B 21/147 353/69 |
| 2005/0237492 A1* | 10/2005 | Shinozaki | H04N 9/3185 353/69 |
| 2006/0098167 A1* | 5/2006 | Sato | G03B 21/26 353/35 |
| 2006/0203207 A1* | 9/2006 | Ikeda | H04N 9/3185 353/70 |
| 2007/0008344 A1* | 1/2007 | Medina | G06T 15/10 345/647 |
| 2007/0257941 A1* | 11/2007 | Plut | G06F 9/451 345/660 |
| 2007/0285626 A1* | 12/2007 | Miyasaka | G03B 21/206 353/85 |
| 2009/0278999 A1* | 11/2009 | Ofune | H04N 21/47 348/E3.048 |
| 2010/0002123 A1* | 1/2010 | Nozaki | H04N 23/00 348/E5.022 |
| 2010/0045942 A1* | 2/2010 | Furui | H04N 9/3194 353/69 |
| 2011/0085044 A1* | 4/2011 | Noda | G03B 21/58 348/E5.133 |
| 2011/0210979 A1* | 9/2011 | Furui | G03B 37/04 345/619 |
| 2011/0234994 A1* | 9/2011 | Uchiyama | H04N 9/3185 353/121 |
| 2011/0285971 A1* | 11/2011 | Oka | H04N 9/3185 353/70 |
| 2011/0292351 A1* | 12/2011 | Ishii | H04N 9/3185 353/69 |
| 2013/0245877 A1* | 9/2013 | Ferguson | G05D 1/0231 701/23 |
| 2014/0303827 A1* | 10/2014 | Dolgov | B60W 60/0053 701/23 |
| 2015/0094897 A1* | 4/2015 | Cuddihy | B60W 30/00 701/23 |
| 2015/0336502 A1* | 11/2015 | Hillis | G05D 1/0088 701/23 |
| 2017/0240096 A1* | 8/2017 | Ross | G05D 1/0212 |
| 2018/0158102 A1* | 6/2018 | Choi | G06Q 30/0251 |
| 2021/0168440 A1* | 6/2021 | Ho | H04N 21/4122 |
| 2021/0310823 A1* | 10/2021 | Wilbers | G01C 21/387 |
| 2021/0341310 A1* | 11/2021 | Wilbers | G01C 21/30 |
| 2022/0171412 A1* | 6/2022 | Cui | G05D 1/12 |
| 2022/0201262 A1* | 6/2022 | Chen | H04N 9/3185 |
| 2022/0242430 A1* | 8/2022 | Watano | G06F 3/1423 |
| 2023/0010713 A1* | 1/2023 | Park | G03B 21/142 |

* cited by examiner

- 100 - Projector
- 200 - Vehicle
- 310 - Camera
- 320 - RADAR
- 330 - LIDAR
- 340 - GPS
- 350 - Ultrasonic Sensors
- 360 - Infrared Sensors
- 410 - Computer
- 420 - GUI Interface
- 430 - Projector Control Module
- 440 - Driving Control Module
- 450 - Sensor Control Module
- 500 - Battery

VEHICULAR PROJECTION SYSTEM

CROSS REFERENCE TO RELATED APPLICATIONS

The present application claims the benefit under 35 U.S.C. § 119 of U.S. Provisional Application Ser. No. 63/298,374 filed Jan. 11, 2022. The U.S. Provisional Application Ser. No. 63/298,374 filed Jan. 11, 2022 is hereby incorporated by reference in its entirety.

FIELD

The present invention relates generally to a system for projecting audiovisual content in public space where the projector is mobile and operatively connected to, part of, or integrated with a transportation body.

BACKGROUND

Big changes are taking place the automotive industry. One such change is electric batteries replacing the internal combustion engine. While the purpose of this change is to decrease usage of fossil fuels, there are ancillary benefits to 'electric cars' as well. One benefit is that electric cars run silently. Another benefit is that electric cars do not emit harmful fumes when the car is running. These benefits mean that electric car owners may use their cars in ways that were previously dangerous. For example, the owner of an electric car may sleep overnight in their car while the car's electric battery regulates the internal temperature of the car without making any noise or emitting any harmful fumes.

Another big change in the automotive industry is the integration of sensors into the car's design. The purpose of these sensors is to continuously capture data about the area surrounding the car so that the car can drive autonomously. Autonomous vehicles are commonly referred to as self-driving cars. The primary purposes of autonomous vehicle technology relate to driving. Namely, self-driving cars may be safer than human-operated cars and far more convenient for the person traveling inside the car as well.

In the years to come, the combination of these automotive changes, resulting in the creation of battery-powered autonomous vehicles, will significantly alter the ways people use their cars. For example, vehicle sensors, self-driving capabilities, batteries, and the like may be utilized for audio/visual purposes, such as projection of audio/visual content. Accordingly, it may be advantageous for a system to provide the audio/visual capabilities identified above.

SUMMARY

Accordingly, the present disclosure is directed to a projection system, the projection system including a projector that is operatively connected to a vehicle, where the operation of the projector is facilitated by utilizing sensors operatively connected to the vehicle. In embodiments, the vehicle is powered by one or more rechargeable batteries and is equipped with numerous sensors. The sensors continually retrieve data from the area surrounding the vehicle and share collected data with a computer system associated with the vehicle. The computer system processes the data creating directions for the automotive controls of the vehicle which transport the vehicle to a preselected destination. The projector is operatively connected to the vehicle. The projector is powered by the vehicle's rechargeable battery and connected to a computer system that is associated with the vehicle. The projector is operatively connected to the sensors through a computer housed inside of the vehicle. When directed to do so, the sensors scan the area surrounding the vehicle to identify a suitable surface able to accurately reflect light that is emitted by the projector. Once such a surface is identified, the computer system directs the automotive controls to move the vehicle to the optimal location for the projector to emit light onto the surface. When the vehicle is at the optimal location, the computer system processes data received from the sensors into directions that it sends to the projector which manipulate the controls of the projector so that the visual content emitted from the projector is accurately reflected on the surface. Prior to, during, or after this process, the user may select digital content from a variety of sources that are operatively connected to the projection system, and the selected content is emitted from the projector onto the surface. Information gathered by the projection system is shared via wireless networks with a remote database of projection locations that may be accessed by other users seeking a place to use other projection systems.

A database system of projection locations is also disclosed, including at least one remote server that is accessible to authorized users of the projection system over a wireless network to download and upload computer-generated data and user-generated data related to projection locations. In embodiments, when a user's vehicle is not proximate to a suitable projection surface and the user desires to use the vehicle's projector, the user may access the database of projection locations that are nearby the user's vehicle or nearby a different location selected by the user. Relevant projection locations may appear on a screen housed inside the vehicle in the form of a map, a list, and the like. Information about the projection location displayed to the user may include the name of the projection location, its current distance from the user's vehicle, the size and dimensions of the projection surface, the reviews other users have given the projection location, photographs and comments of the projection area, and whether the projection location is currently available for use or is being used by another vehicle projection system connected to the database system. Once the user has decided on a projection location, the user may select the location from the screen housed inside the vehicle, or by voice command, and then direct the vehicle to travel to the location. Once the vehicle arrives on location, the projection system may automatically initiate, the sensors scanning the area and adjusting the vehicle and the projector to the specifications ideal for projection. From the time that the vehicle begins travelling to the projection location until the vehicle leaves the projection area, the projection location may not be available to other users who are seeking a location to use their vehicle's projection system.

Sometimes a surface that was suitable for projection will become unsuitable for projection; other times an area that is the shape of a suitable surface will be unsuitable because it lacks a reflective color, is made of an unsuitable substance, contains an advertisement or artwork or for some other reason. In embodiments, information about the unsuitable surface may be collected by the projection system and shared to the database. This information may not be accessible to users of the projection system but may be used in other ways such as to repaint a once suitable projection surface or to identify when an advertisement or artwork has fallen into disrepair and notify the owner of the property.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The detailed description is described with reference to the accompanying figures. The use of the same reference numbers in different instances in the description and the figures may indicate similar or identical items, or different potential locations of an item. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

A description of an exemplary system, which incorporates embodiments of the present invention, is hereinafter described. Embodiments of the present invention provide for the projecting of images in a variety of environments, specifically outdoor spaces. An apparatus that improves the mobility, portability, and usability of projectors is disclosed.

In embodiments, a projector may use a light source to project an image or moving images (as used herein, image shall include a still image and moving images) onto a surface. Projectors often utilize mirrors or other materials to reflect or refract the light before the light goes through a projection lens. The surface is often a screen designed to reflect projected light, yet numerous other surfaces exist that can adequately reflect a projection. Such surfaces include but are not limited to walls, rocks, garages, or any other flat and reflective surface.

A variety of lamps may serve as the light source, including for example, metal halide lamps, high-intensity discharge lamps, Ultra-High-Performance lamps, Light Emitting Diodes Lamps, lasers, and hybrid projectors (typically a combination of LED and laser). Most projectors use a single light source, but some projectors emit light with an array of a plurality of pixelated lamps, e.g., laser projectors.

Projectors historically have been used in controlled environments, i.e., indoors in a room with low light intensity. High luminance levels (high lux) can interfere with a projected image causing a poor-quality display especially where the projector does not compensate for the higher light intensity. Similarly, projector screens are often employed not only because they are flat but also because they are made with materials with certain reflective properties and designed with particular shades of certain colors (white, yellow, silver, grey) that minimize color distortion or other interference. Although distorted images are often fixed by adjusting the projector's settings, real time adjustments are cumbersome and challenging for a layperson.

One aspect of the present invention addresses this problem and provides for a mobile projector system, operatively attached to a vehicle, that automatically adjusts its position and settings in response to or based upon data relating to environmental conditions where, in a preferred embodiment, the system uses data gathered from sensors operatively connected to the vehicle.

In preferred embodiments, the projection system can identify a location where a screen or suitable surface exists. The location may be a particular longitude, latitude, altitude, or any combination thereof. It may also be a line, an area or a volume set by longitudes, latitudes, altitudes, or any combination thereof. A location may be relative to an object, e.g., a screen, a vehicle, a sensor, a smart phone, or any combination thereof. A location may be stored in memory, obtained via user input, or determined using data received from sensors.

In embodiments, the projection system is capable of positioning the projector at the location and adjusting the projector's position and settings to optimize the displayed projection. In preferred embodiments, the projector may automatically move or adjust the projector's position, direction, angle, or any combination thereof in order to project an image with minimal or no distortion.

In embodiments, the projector may be adapted to automatically adjust settings to display the image in a desired manner, including for example, adjustments relating to or concerning the projection angle, image size, zoom lens, focus lens, light intensity, aspect ratio, throw distance, throw ratio, energy consumption, quality, blurriness, scaling, display parameters (such as contrast, brightness, color, or any combination thereof), resolution, filtering, or any combination thereof in response to information received, sent, captured, or processed by one or more sensors. For instance, a projector may adjust its light intensity in response to data or information relating to the level of ambient light. In embodiments, the projection system includes one or more sensors wherein a projector adjusts its position or settings in response to or based upon information or data received from the at least one of the sensors.

For purposes of this disclosure, a sensor is a device used to receive, send, capture and process data and images about the environment that is proximate to the vehicle and projector. A sensor receives, sends, processes, captures, measures, obtains, evaluates, or determines information or data wherein such information or data may be used by the projector system. Data that is gathered by sensors may be shared with the projector through one or more computers operatively connected to both the sensors and the projector. Examples of sensors include, but are not limited to, LIDAR, RADAR, Video Camera, Ultra Sonic sensors, Infrared Sensors, and Global Positioning Systems (GPS). The processing of data gathered by sensors or sent to sensors may be computed by processors that are communicatively coupled to the sensors or by another computer 410 operatively connected to the projection system.

Further, a sensor may be adapted to gather, capture, obtain receive, send, or process data or information that is used by the system for a variety of purposes, including for example, to identify suitable surfaces onto which a projection can be reflected, align the vehicle and the projector to the best possible location and position for a surface to reflect a projection, identify surfaces that are unsuitable for projection and determine why the surface is unsuitable, adjust the settings on the projector to that the content projected is as accurately displayed onto the projection surface as possible, assure quality control of projected images throughout the projection, verify the number of people around a vehicle that are watching the projection, identify emergencies, generate alerts, and notify first responders or other parties of the need for emergency assistance.

In embodiments, a plurality of sensors may form a network with a centralized server that receives and processes information received from each of the plurality of sensors and sends instructions to the projector based on the information wherein the projection system processes said instructions to make adjustments that optimize the projected content. In other embodiments, a plurality of sensors may form a non-centralized network, wherein a first sensor sends information that is dependent or partially derived from a second sensor.

In embodiments, a control module may be operatively connected to a projector and at least one or more of the sensors. The control module may comprise of hardware, software, firmware, circuitry, magnetic devices, electrical signals, mechanical components, any combination thereof, or any other necessary materials. In general, the control modules may control any component in the projection system, including a projector, a vehicle, a sensor, or any combination thereof. The control module may comprise of one or more other modules, including a projector module, a vehicle module, a sensor module, or any combination thereof.

In embodiments, a control module may communicate with a computer housed inside the vehicle and from user devices (such as a smart phone, tablet, handheld device, etc.), directly or indirectly (e.g., via a network). The control module may receive human inputs preferably through a graphical user interface ("GUI"), preferably on a touchscreen housed inside the vehicle or the user device. Through the GUI, a user may, for example, find a nearby screen, reserve a screen, search for local surfaces to project audiovisual content, control and adjust the projector, initiate special projections, including for example, emergency projections, and/or control the selection and playback of video content.

In embodiments, a control module may be adapted to provide functionality for identifying a location to use a projector, provide instructions to move the vehicle to a location with a screen or suitable surface to use with the projector, position the projector, adjust the projector's settings, and implement other aspects of the disclosed invention.

A control module may also utilize data from one or more sensors to optimize the projected image on the screen. For example, the control module may direct the projector to alter the angle of projection, its direction, the size of the image projected, the projector's zoom lens, the focus lens, the intensity of light emitted, filters, to change the projected image, or any other possible task to obtain the desired display of the image projected.

A control module may process images of an audiovisual content item that have captured while projection the content item to adjust the settings based upon its non-distorted digital image to minimize distortion or other variations.

In embodiments, the projection system may include a user interface where the user may interact with the projector system, including finding a projection screen, identifying a suitable projection surface, searching and selecting audiovisual content, and/or controlling the playback of audiovisual content. In an exemplary embodiment, a processor may process information to synchronize a projected image with audio from a separate source.

The projection system may have means to communicate, or alternatively include peripheral components that are configured to communicate, via adopted technology standards, e.g., wireless (WIFI, Bluetooth, etc.), radio, HTTP, etc. Optionally, the system may employ a smart audio peripheral that records audio near or around the projector or the screen and use the recordings to identify events and/or movements in or around the area to manage its operation, e.g., sensing objects, identifying user behavior and reactions (e.g., in response playing content), ensuring security, or any combination thereof. The smart audio peripheries operatively communicate through a processor in the control module, the projector system, or any component connected thereto, including for example sensor, a cellular network, a local WIFI network, or any combination thereof.

FIGS. 1A-1G Illustrate a variety of vehicles 200, in accordance with one or more embodiments of the present disclosure. In embodiments, a vehicle 200 may include a car, a truck, a camper, a bus, a motorcycle, a Humvee, and a military transportation vehicle. Depictions of these vehicles is not meant exclude any other types of vehicles not illustrated in FIG. 1 from the scope the invention. The vehicles in FIGS. 1A-1G include possible locations where one or more projectors 100 may be located. The projector locations depicted in FIGS. 1A-1G are not meant to be exhaustive; they merely represent likely places for a projector 100. The representation of a car is used throughout the remaining Figures in this disclosure to represent vehicles 200 in general and is interchangeable with the other vehicle types displayed in FIGS. 1A-1G or any other vehicles not illustrated in FIGS. 1A-1G.

Figure 1A:
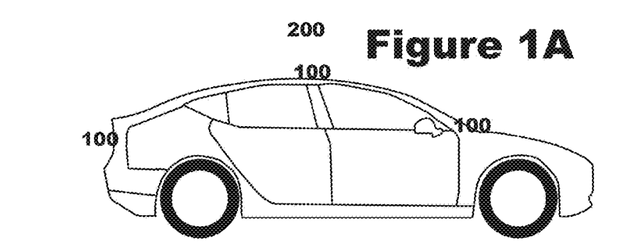
FIGS. 1A-1G illustrate various examples of vehicles with which the projection system may be used and possible locations of the projector system on the vehicles, in accordance with one or more embodiments of the present disclosure.
Figure 1B:
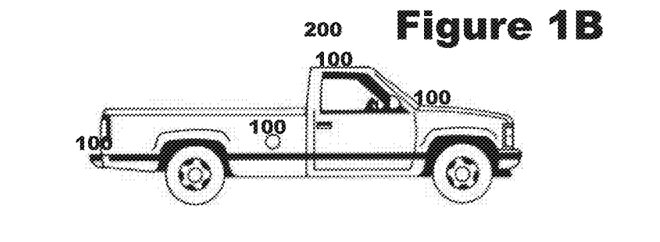
Figure 1C:
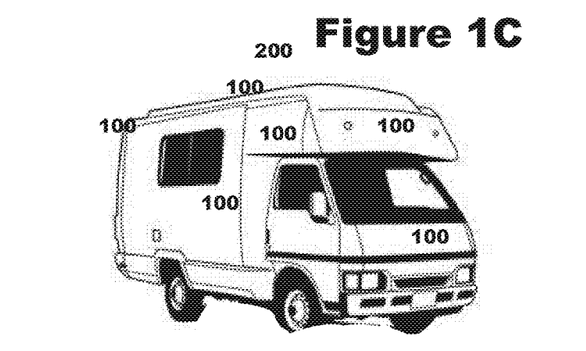
Figure 1D:
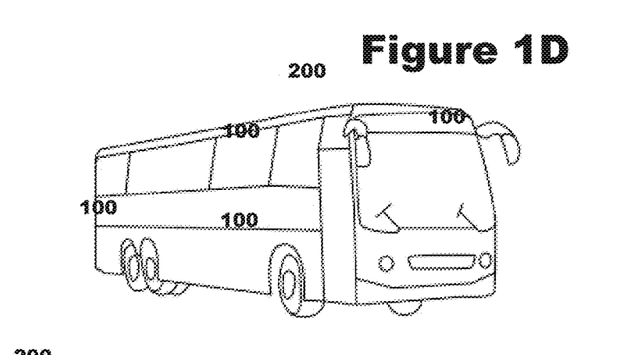
Figures 1E, 1F:
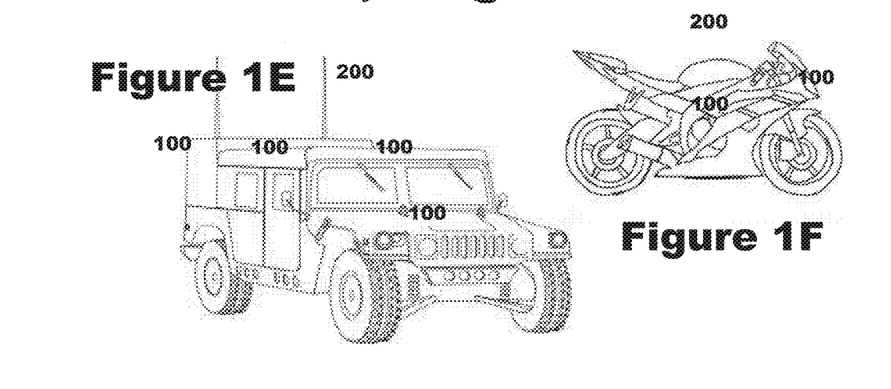
Figure 1G:
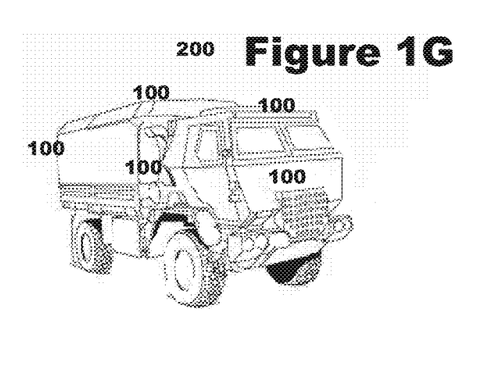
Figure 2:
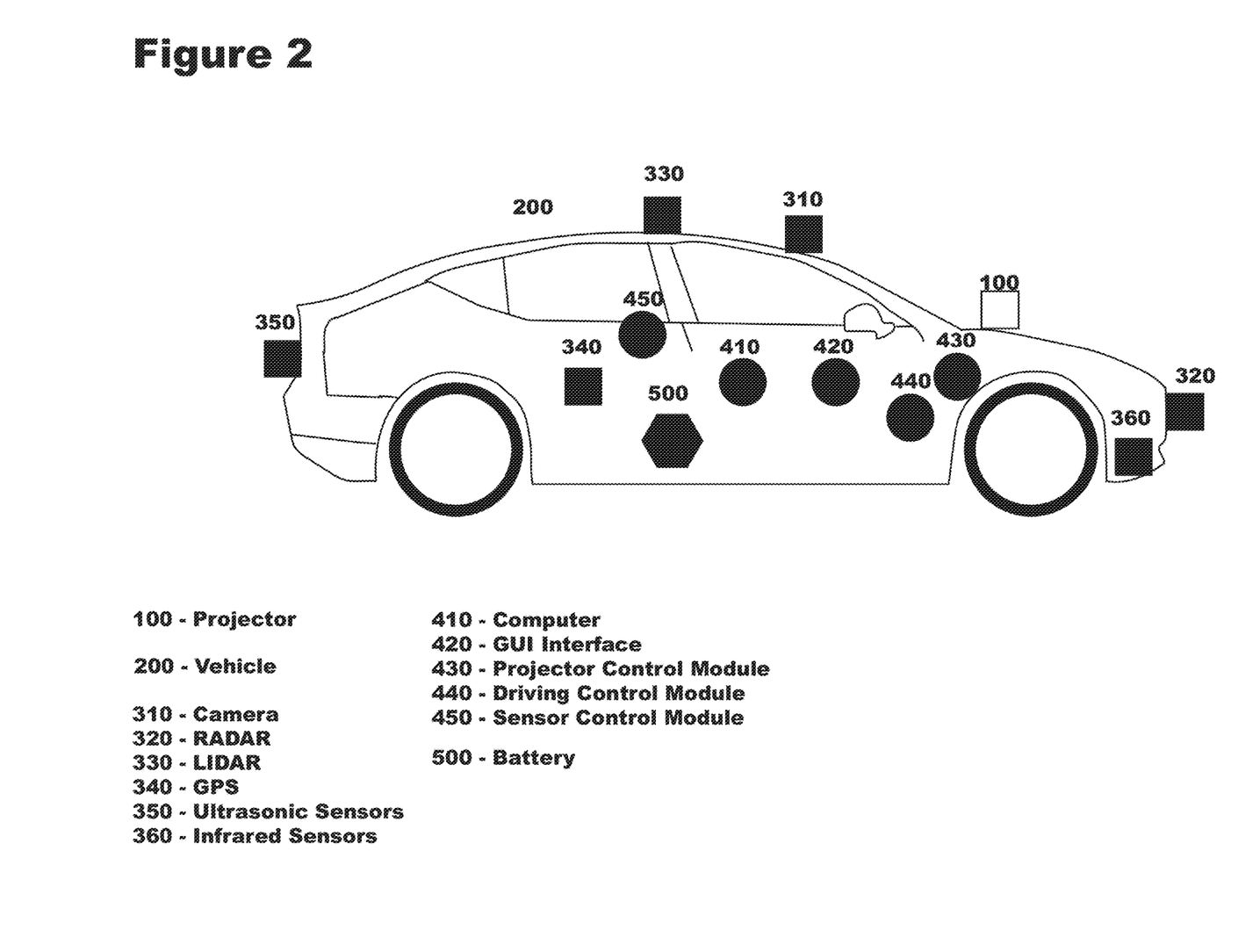
FIG. 2 illustrates the hardware implementation of the projection system, in accordance with one or more embodiments of the present disclosure.

FIG. 2 Illustrates the exemplary embodiments of a projector system, in accordance with one or more embodiments of the present disclosure. In embodiments, the projector system may include a projector 100, a vehicle 200, one or more sensors 300, a computer 410, a Graphical User Interface (GUI) 420, a Projector Control Module 430, a Driving Control Module 440, a Sensor Control Module 450 and a Battery 500 that are all operatively connected together. In embodiments, the one or more sensors 300 include a camera 310, a Radio Detection and Ranging sensor (RADAR) 320, a Light Detection and Ranging sensor (LIDAR) 330, a Global Positioning System (GPS) 340, one or more ultrasonic sensors 350, and one or more infrared sensors 360. In preferred embodiments, one or more sensors 310, 320, 330, 340, 350, 360 are original components of the vehicle 200 or have access or receive data from such original components. The projector 100, one or more sensors 300, computer 410, GUI 420, Projector Control Module 430, Driving Control Module 440, Sensor Control Module 450 and battery 500 may be attached, connected, or proximate to anywhere on the vehicle 200.

Figure 3:
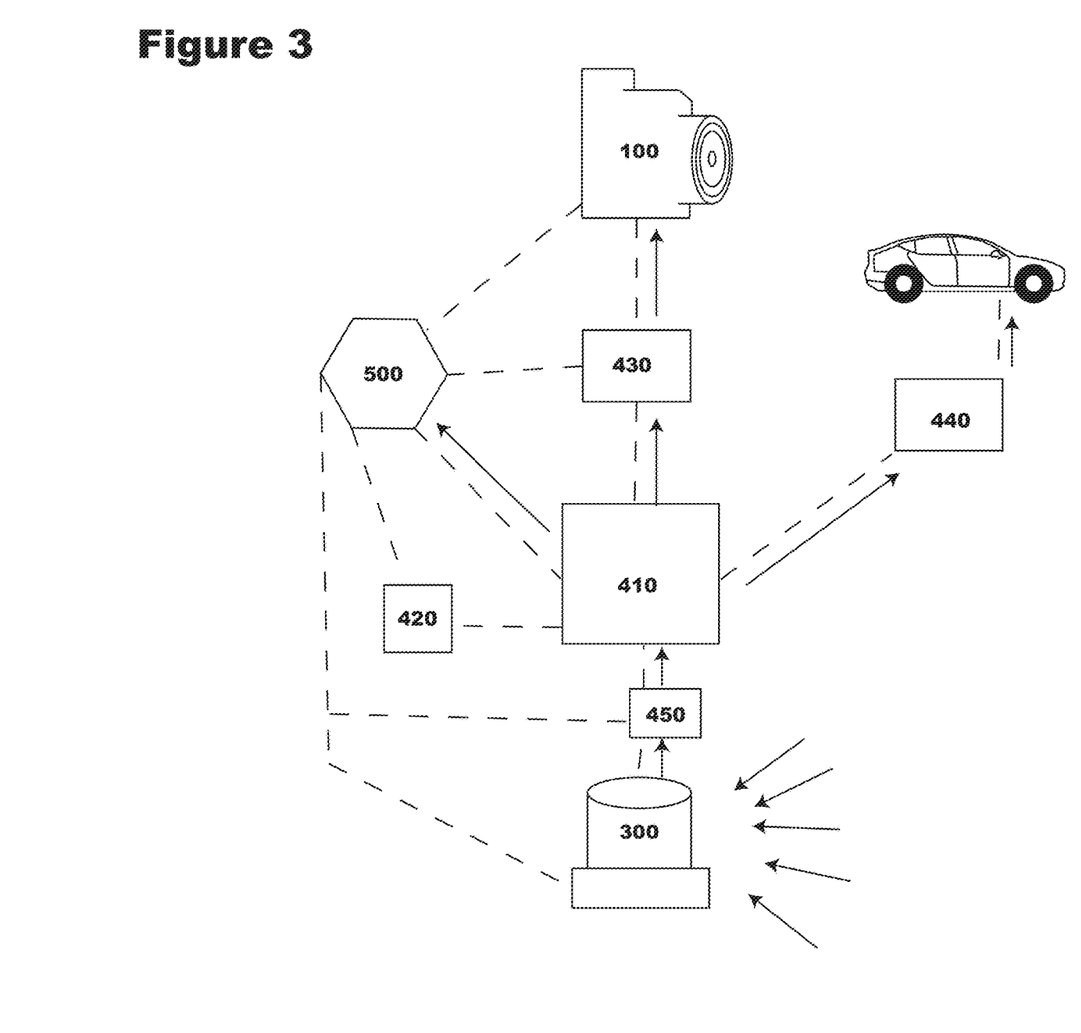
FIG. 3 is a block diagram illustrating the components of the projection system, in accordance with one or more embodiments of the present disclosure.

FIG. 3 Illustrates data being captured by a sensor 300 from a nearby surface, the sensor 300 sharing that data with the computer 410, wherein the data is processed and shared with the projector control module 430 and the driving control module 440, in accordance with one or more embodiments of the present disclosure. In embodiments, data sent from the computer 410 to the driving control module 440 directs the vehicle to move to the optimal location for the projector 100. Data sent from the computer 410 to the projector control module 430 alters the projector 100 so that the projector 100 accurately projects onto the surface. Data (e.g., a movie selected by the user of the projection system) is received from the GUI Interface 420 and sent to the computer 410. The computer sends this data to the projector control module 430 and the projector control module 430 sends the data to the projector 100. Each of these components illustrated in FIG. 3 are connected to battery 500 housed inside of or proximate to the vehicle 200. In this illustration, a miniature depiction of a car is used to represent the driving function of an autonomous vehicle 200, that is controlled by the driving control module 440. In preferred embodiments, the driving function of the vehicle is also powered by the battery 500.

In embodiments, the projector 100 projects an image on the suitable surface wherein the display may be optimized through automatic adjustments to the vehicle's location or projector's location, position, direction, angle, or settings in response to data received from one or more sensors 300. In embodiments, data may be processed by the computer 410 to determine the relative location and position of objects, such as the vehicle 200, the projector 100, and the surface onto which the projector 100 will display visual content 300.

Figure 4:
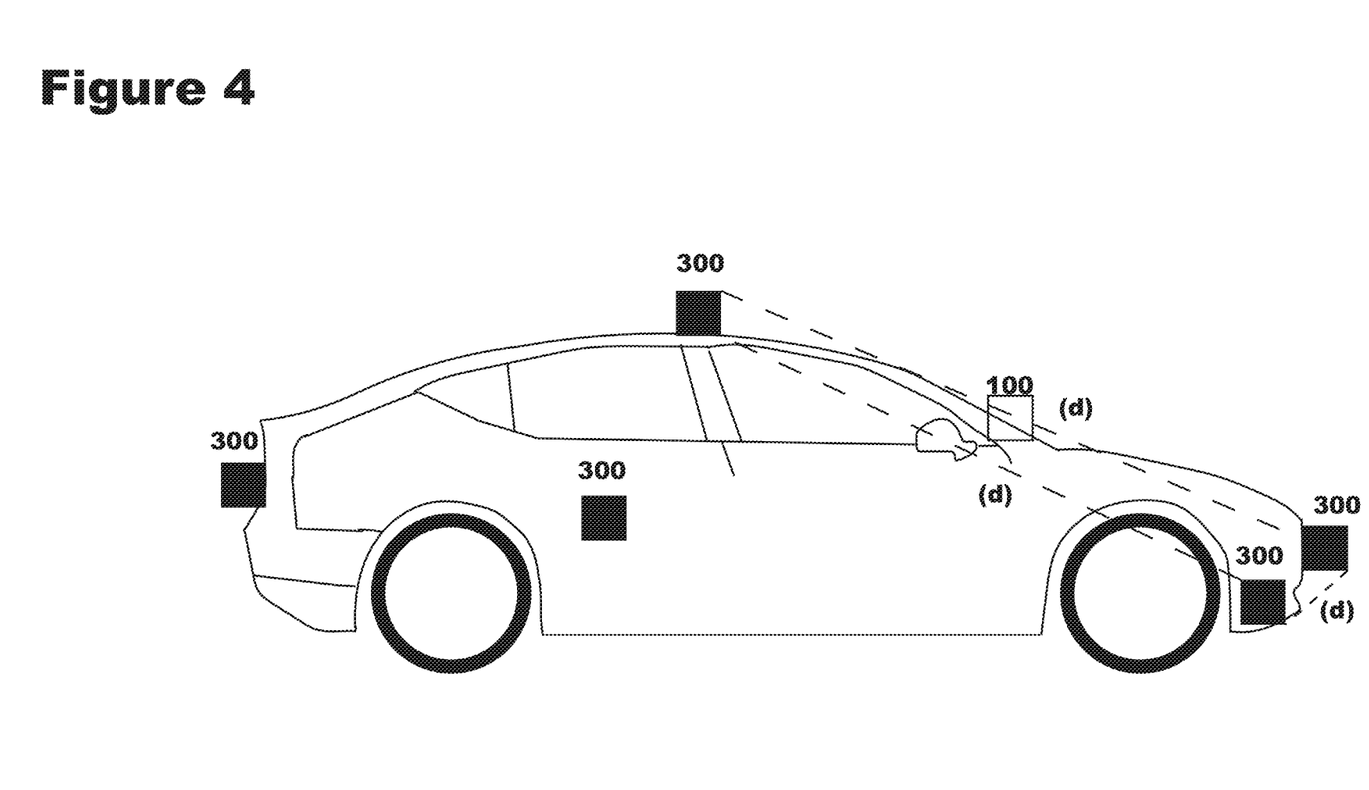
FIG. 4 illustrates known distances between the sensors and other components of the projection system, in accordance with one or more embodiments of the present disclosure.

In preferred embodiments, as illustrated in FIG. 4, two of the one or more sensors 300 may be affixed to the system so that a first sensor 300 is in a fixed position with respect to a second sensor 300 as well as the rest of the sensors. This embodiment provides a frame of reference that facilitates tasks like calibration, distance measurement, and projector adjustments. It also increases efficiency to find a suitable surface for projection, to position a projector 100, or adjust settings to improve display quality.

For instance, as shown in FIG. 4, a vehicle may include a first sensor 300 on the top of the vehicle 200 and a second sensor 300 and third sensor 300 on the front of the vehicle 200 that are a fixed distance (d) from each other and the projector 100. The first sensor 300 is relatively fixed vis-à-vis the second sensor 300 and third sensor 300, so that the accuracy of the sensors may be easily verified. In addition, the one or more sensors 300 may be used to triangulate their relative positions allowing the control modules 430 and 440 to accurately determine the distance and position of a given object.

In embodiments, the projector 100 may receive instructions to change its settings which may be in response to data obtain through or from one or more sensors 300. For example, the sensor 300 may provide data or information to the projector control module 430 where such data or information indicates that the projected image is out of focus. In response to this information and data, the projector 100 may receive directions to adjust its lens to focus the projected image. The control module 430 may also instruct the projector 100 to automatically adjust its settings based upon the projector's specifications or recommended settings. In another example, the projector 100 may reposition or adjust itself to fix distortion, e.g., keystone effects, in response to data or information that indicates distortion is present.

In embodiments, the projector 100 may adjust its settings in response to data or information obtained by or through one or more sensors 300s such as settings relating to lenses, zoom, focus, masking, light intensity, color, filters, brightness, contrast, saturation, sharpness, throw distance, throw ration, aspect ratio, resolution, image size, any combination thereof and any other projector settings.

Automatic adjustments in response to data received from one or more sensors 300 are advantageous because the changes occur in or close to real time. The automation also increases the projector's usability. The responsive adjustments also account for fluctuations in the environment that cannot be addressed manually without hiring a professional. For instance, certain environmental factors that may reduce the quality of projected images may change frequently throughout the showing of content like a movie. To illustrate, the luminance level on a night with a full moon that is intermittently masked by opaque clouds can change the luminance level by an order of 1,000 lux. With the invention, a sensor 300 will obtain data that shows changes in luminance levels and the projector 100 will adjust the appropriate settings in response to these changes in luminance levels to maintain a consistent quality picture.

Another benefit of the present invention is the system's ability to project quality images by automatically adjusting the projector's location, position, direction or any combination thereof to facilitate a projection taking into account the surrounding environment. To illustrate, if a user selects a surface at a certain address, the driving control module 440 will take the vehicle to that address. Once the vehicle 200 is at the address, the sensors 300 can identify the optimal surface for a projection and inform the computer 410 and the driving control module 440, wherein the driving control module 440 can then identify the optimal location, position and direction for the vehicle 200 to park so that the projector is in the best location for projecting onto the surface. The driving control module 440 may instruct the vehicle 200 to drive to that area and park at a precise location while facing a certain direction. If impediments prevent parking a vehicle at the ideal location, the driving control module 440 will also identify and move the vehicle to the next best location. When necessary, the projector 100 may alter its position relative to the vehicle 200 to perform a projection such as twisting left or right, or angling the lens upward or downward.

Other sensors not previously mentioned in this disclosure may be used as part of the present invention. At the heart of this invention, is using sensors that will be common to autonomous vehicles. Such sensors may include those previously listed include, video cameras, LIDAR, RADAR, GPS, infrared sensors, ultrasonic sensors but the general meaning of "sensor" is anything that captures, measures or determines information or data regarding the environment as well as the vehicle's and projector's relation to its environment, including audio recorders, heat sensors, climate sensors, high-resolution scanners, magnetometers, gesture sensors, gyroscopes, humidity sensors, thermometers, weight scales, pressure gauges, open/closed sensors (e.g., to determine whether a projector is ajar), light sensors, motion sensors, water detectors (generally contained within a projector), or any combination thereof.

In embodiments, a first sensor 300 may be communicatively coupled to a second sensor 300. For example, a sensor 300 may be coupled to a processor for data processing. In embodiments, a sensor 300 may access, receive, or send data from or to another sensor 300, computer memory, a network, user input, a user device, a processor, an image capturing device, any device capable of emitting or receiving electronic signals, or any combination thereof.

In embodiments, one or more sensors 300 may be in a fixed or variable position with respect to an object. For example, a sensor 300 may be fixed on or within a certain location of a projector 100, or a vehicle 200. Fixed sensors 300 allow greater calibration and more precise measurements, especially with respect to distances. A plurality of sensors 300 wherein at least two of the plurality of sensors are affixed on an object at a predetermined or known height above ground may provide a reference for determining the projectors 100 position relative to the surface it is projecting onto.

In embodiments, one or more sensors 300 may be configured to capture, provide, or process information or data for multiple purposes, including for example: mapping the position and shape of objects in the local environment, locating suitable surfaces for projection, ascertaining the position for a projector 100, a vehicle 200, a surface, or any combination thereof, determining optimal positions for a projector 100 or a vehicle 200 for purposes of projection, evaluating whether a vehicle 200 may safely reach a position, providing instructions to a projector 100, a vehicle 200, to move to a position or adjust its position or direction, providing instructions to a projector 100 to adjust its settings, managing the power usage of the battery 500, performing quality control and quality assurance, and identifying and responding to emergency situations.

In embodiments, the system may include a projector control module 430, a driving control module 440, and a sensor control module 450. The modules 430, 440, and 450 may include a computer 410 housed inside the vehicle or they may part of the systems they are intended to control. For example, the projector control module 430 may be built into the projector 100 and the driving control module 440 may be built into the autonomous driving system. The control modules 430, 440, 450 may also be configured to communicate with a projector 100, a vehicle 200, sensors 300s, a user device (such as a smartphone or computer), a GUI 420, a remote surface database 610, remote content database 620, a local surface database 630, local content database 640, the Internet, and any combination thereof. It is herein noted that modules 430, 440, and 450 may not be separate and distinct components of the system and may share one or more computers, processors, memory, and the like.

For example, a user may choose to access a remote content database 620 from an internet cloud server or to use a local content database 640 on a user device or hard drive in order to access audio/visual content to project. Remote content is sent to the computer 410 over wireless networks such as WIFI, cellular or any other similar network. Content contained on a local database 640 can be transferred to the computer 410 and modules 430, 440, 450 through a wired connection (e.g., a USB port) to the vehicle 200 or through a wireless connection (e.g., Bluetooth, WIFI and Cellular). Once the content is received, it may be sent to the projector 100 and played given the projector 100 is aligned to a suitable surface.

In another example, a user may access a remote surface database or a local surface database through their user device 450 or a GUI 420 to retrieve information about suitable surfaces for a projection. These databases may include information about surfaces including a name for the surface, its GPS coordinates, the ideal positioning for a vehicle 200, the size of the surface, the user reviews attributed to the surface, photos of the surface, comments about the surface, whether the surface is currently available or it is already in use, the distance the surface is from the user's current location or a different address they have selected, the estimated time it would take the user to drive to the surface from the user's current location or a different address they have selected, the projector settings that are most commonly used by other users when they are using the surface for projection, whether there are battery charging stations at the surface, and any other information that may be utilized to make a decision about what surface to use. Once the user has selected a surface, the user may press a button on the GUI 420 or give a voice command, which may cause the vehicle 200 to navigate to the surface, and orient itself to the surface. After orientation of the vehicle, the projector 100 may adjust to accurately projecting onto the surface.

In embodiments, the projector control module 430 may adjusts various settings to match the projected image to an undistorted digital image. In embodiments, at least one of the one or more sensors 300 comprise of a high-resolution camera to capture a projected image. The projector control module 430 may compare the captured image with the corresponding digital image. For example, if the images match and are of equal quality, no adjustments are made. If, however, the captured image is distorted, the projector control module 430 may identify the distortion and provides instructions to the projector 100 to adjust its settings to remove the distortion.

In embodiments, the projector control module 430 and the sensor control module 450 may be configured to employ image-processing techniques to identify the settings that need to be adjusted to remove the distortion. For example, the difference between the pixel matrixes of the digital image and the pixel matrix of the distorted image may be calculated to create a differential matrix that may show the cause of the underlying distortion. The differential matrix may have uniform values throughout which indicates the color may need to be adjusted. In another example, the differential matrix may have values of zeros (which indicate the pictures match) except for the edges that suggest the distortion may be due to the projector's position, direction, or angle. If a cause is not identifiable via these techniques, the control modules 430 and 450 may be configured to employ artificial intelligence techniques to test simulated adjustments until it finds the settings that need to be adjusted to match the undistorted image. If the user desires to project a transformation of the original image, the control modules 430 and 450 would use a transformed image instead of an undistorted image to identify the distortion caused by the projector 100.

In preferred embodiments the projector control module 430 may be configured to prioritize removing a major distortion over a minor distortion using a predetermined list of distortions to prioritize. Similarly, the control modules 430 and 450 may be adapted to identify when a distortion is due to environmental constraints (e.g., a bylaw that limits luminance levels), technological restraints (e.g., the projector's display resolution falls below the digital image's resolution), or other external factors that cannot be resolved by adjusting the settings. The ability to identify unresolvable issues is advantageous, as it conserves energy while also ensuring that the projector control module 430 does not, for example, violate local ordinances by increasing brightness over the legal limit or lower the quality of the projected images due to instructing the projector 100 to make continuous adjustments.

In embodiments, a projector control module 430 may be configured to communicate with a plurality of projectors 100 to project an image on a surface. The plurality of projectors 100 may intensify the projected image by projecting the same image to the same area on the screen or surface. In alternative embodiments, the plurality of projectors 100 may include a first projector 100 and a second projector 100 where the projector control module 430 stitches a first image from the first projector 100 with a second image from the second projector 100 to form an extended image. The control module 430 may adjust a picture projected from a plurality of projectors 100 in the same way that it may do so for an image projected using one projector. In further embodiments, a plurality of projector control modules 430, wherein each control module may communicate with one or more other projector control modules 430 therein, may be used to project an image from multiple projectors 100 to project an image on a surface.

In embodiments, if the driving control module 440 obtains data from one or more sensors 300 that reveal the vehicle cannot park in the first location due to a hazard or parking restriction, driving control module 440 may move the vehicle 200 to a second location for vehicle 200 where it may park and may instruct the vehicle 200 or user to park in the second position. For example, in the second position, the projector 100 may not be accurately aligned with the surface. To compensate for the misalignment, the projector control module 440 may alter the projector 100 so that the projection is accurately displayed on the surface.

Figure 5:
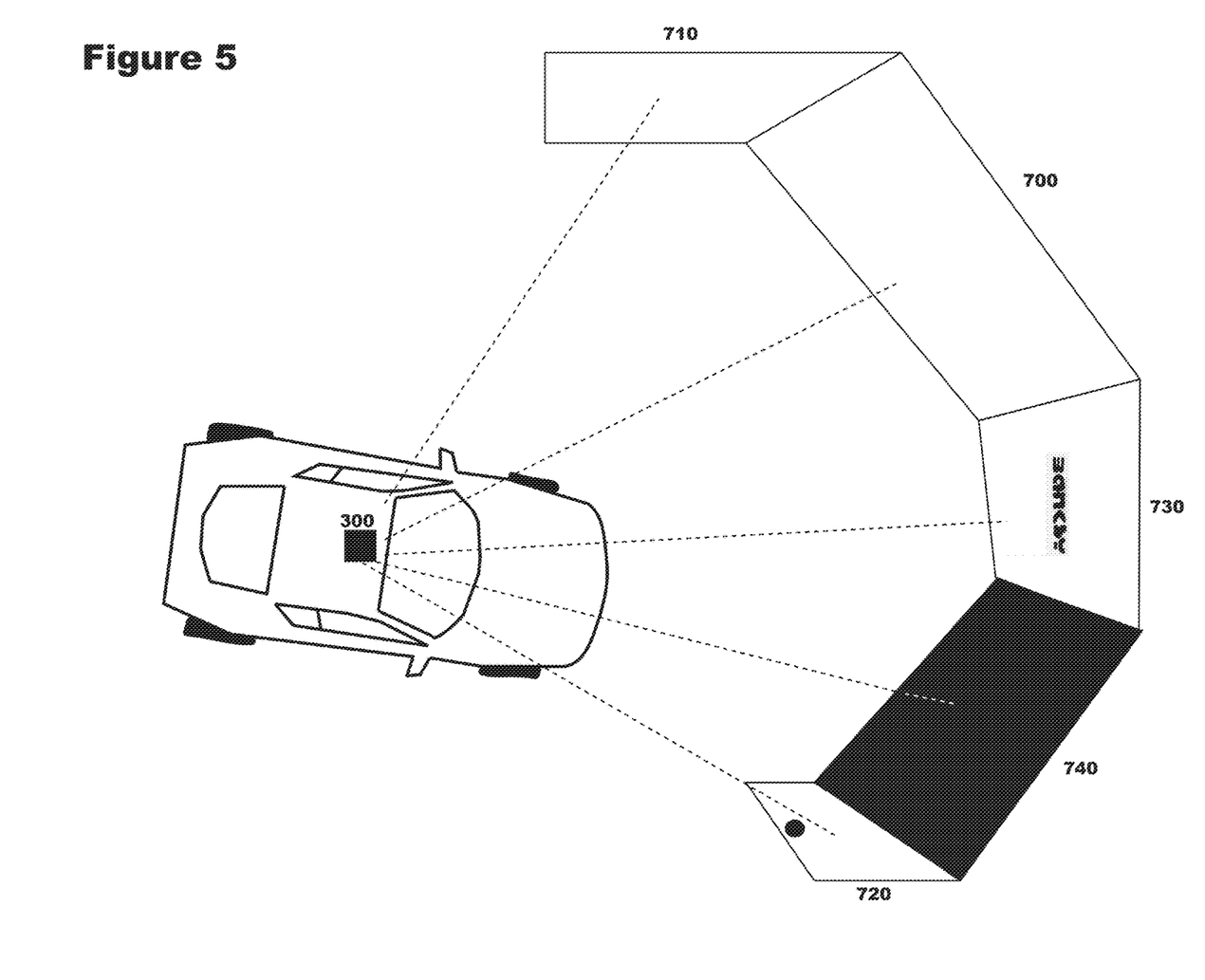
FIG. 5 illustrates the projection system scanning numerous surfaces, in accordance with one or more embodiments of the present disclosure.

FIG. 5 illustrates embodiments wherein one or more sensors 300 on the vehicle 200 identify multiple surfaces and determines which surface is most suitable for projection. For example, as illustrated in FIG. 5, there are five surfaces each unique from the other. One surface 720 is a glass door that is too small, non-reflective and busy to be a suitable surface for projection. Another surface 740 is painted black and does not reflect light. Another surface 730 contains a defacement by a local graffiti artist making it a surface not suitable projection. The remaining couple of surfaces, 710 and 700, are both identified as suitable surfaces for projection, but the sensors determine that surface 700 is a better surface for projection based on its shape and size. Data about each of the surfaces, is collected and shared with the remote surface database. On the remote surface database suitable surfaces for projections 710 and 700 will be made accessible to other users of the projection system when they search for surfaces on the database. Data about the other surfaces, 740, 730, and 720 may be shared with the remote surface database but may not be shared with other users of the projection system that are seeking suitable surfaces for projection.

Once the best surface for projection has been identified, in this case surface 700, the one or more sensors 300 inform the driving control module 440 to move the vehicle 200 into the best possible location for the projector 100 to accurately project onto surface 700.

Figure 6:
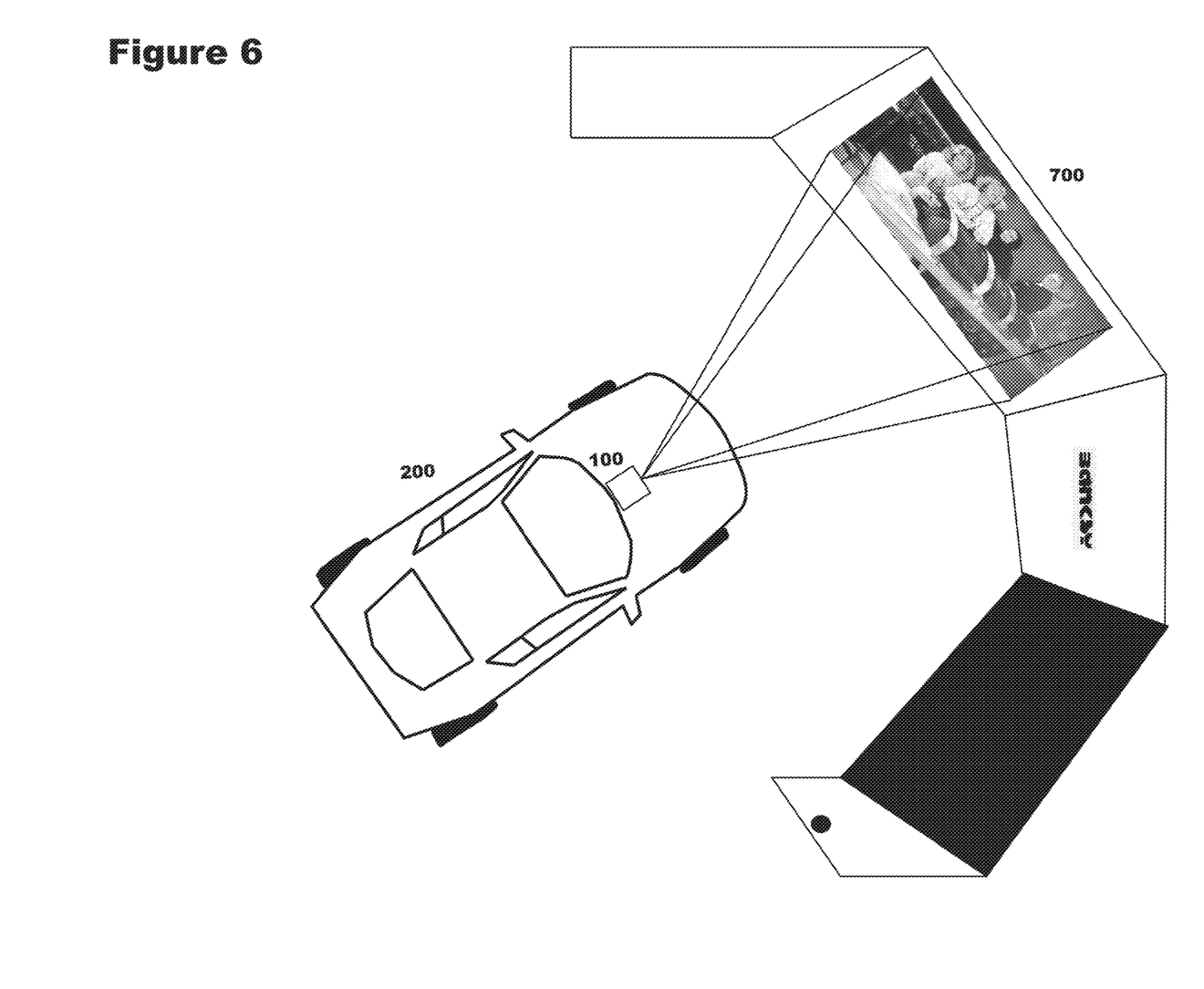
FIG. 6 illustrates the vehicle, having moved into position for projection onto the best suitable surface and projecting onto that surface, in accordance with one or more embodiments of the present disclosure.

Furthering the example, FIG. 6 Illustrates the vehicle 200 repositioned in alignment with the surface 700. The one or more sensors 300 have collected data to inform the projector control module 430 to adjust the settings of the projector 100 to accurately display to projection on the surface 700. In this illustration the user has selected the movie Young Frankenstein.

In embodiments, a suitable surface is any surface that is capable of displaying a projected image. The surface is preferably flat or evenly shaped with a surface that reflects light with minimal distortion. A suitable surface may be a manmade object, such as a building walls, roads, driveways, fences, or movie screens. Alternatively, natural objects may provide a suitable surface, including for example, quarries, naturally formed rocks, and salt flats or any other reflective naturally-occurring object. A surface may be suitable for some content but not for other content. For example, higher resolution images may display differently on a given surface than low-resolution images. Similarly, a surface may be suitable with certain projectors but not others. Environmental conditions may also influence whether a surface is suitable. In addition to its geometry, texture, and reflexive properties, whether a surface is suitable also depends on the projector technology, environmental conditions, and the images to be projected.

In embodiments, to find a surface, the present invention may retrieve information from a database, a network, memory, a user, or any combination thereof regarding suitable surfaces in a certain vicinity of a user or in a desired area. As suitable surfaces are identified, they are stored in a local surface database 630 and shared with a centralized remote surface database 610 via wifi, cellular or a similar means of data communication to a cloud server housing the remote databases, allowing other users to access and download information about these surfaces. A user may choose to keep a surface private from other users. For example, if a surface is on the user's private property and they do not wish others to use it, it may be made private by a user. When a suitable surface is not known or a user desires to find a new suitable surface, the control modules 430, 440, 450 may be instructed to find a nearby suitable surface without the user selecting a specific surface.

In embodiments, the control modules 430, 440 and 450 may employ varying techniques, alone or together, to find a suitable surface. For example, computer 410 and control modules 430, 440 and 450 may access high-resolution maps to determine potential locations of suitable surfaces based on topographical features. A plurality of sensors 300 may be used to collect, process, and analyze data to create a topographical map of the immediate surrounding area. The vehicle 200 may be either parked or driving while such data is collected, processed, or analyzed. The sensors used to find a suitable surface may include but are not limited to RADAR, LIDAR, cameras, high-resolution scanners, infrared sensors, and supersonic sonar sensors.

In embodiments, the control modules 430, 440 and 450 may use varying sensors 300 depending on the desired characteristics of the surface, user input, the current location of the vehicle, the level of luminance, the type of content to be viewed, or a combination of thereof. For example, the vehicle 200 may initially use sensors that allow a larger area to be analyzed with less accuracy, including for example, long-range radars, images of distant objects, or any combination thereof. Upon identifying potential surfaces with long-range sensors 300, the control modules 430, 440, and 450 may select a potential surface and surrounding areas to analyze the area with more precise sensors 300, wherein the sensors 300 are sufficiently precise to establish whether the geometric dimensions of the surface are suitable. Optionally, a user interface 420 may provide a preview of how content may appear if projected on a potential surface based on its location, position and geometric properties.

In embodiments, if a surface appears to be suitable based on its location, position, and dimensions, the one or more sensors 300 may scan the surface with a camera from multiple angles to evaluate whether it is properties are sufficiently suitable, including for example, its color, reflexive properties, its texture, or any combination thereof. A scan with one or more cameras allows a mapping of the surface from a digital perspective to a projector perspective. This mapping may be used to adjust a projector's setting to project an image on the surface with minimal distortion.

In embodiments, when the projection system determines that a surface is suitable, it will send instructions to the vehicle 200 or the user to move to a location to project images on this surface. The projector control module 430 may start preparing the projector 100, adjusting the projector's 100 alignment and settings and utilizing the driving control module 440 to reposition the vehicle to a preferable spot. The projector control module 430 may test the surface with images and if the projector control module 430 successfully projects an image onto the surface, it may upload the location and other related information to a remote surface database.

Figure 7:
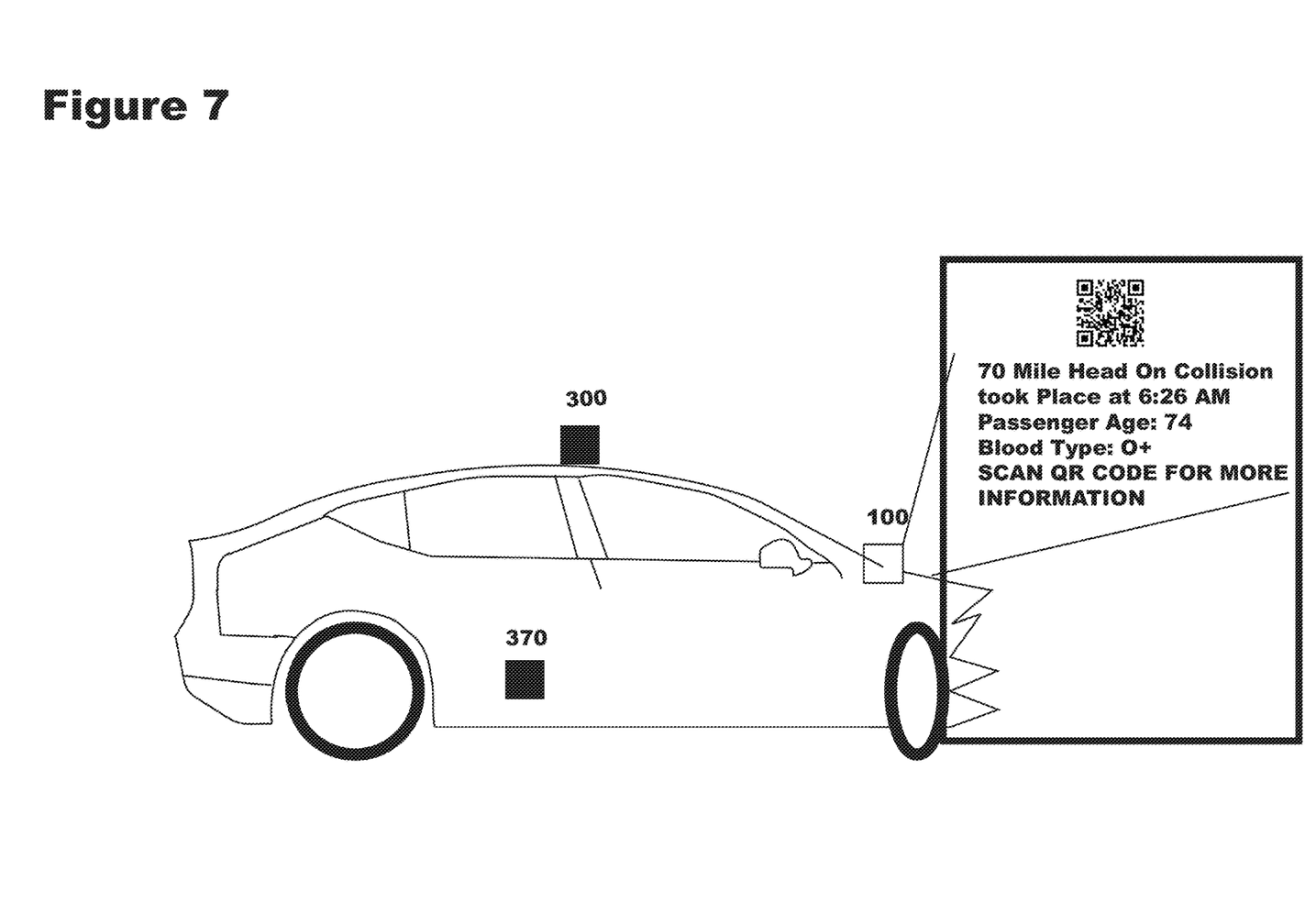
FIG. 7 Illustrates an accident initiating the projection system to provide information to first responders, in accordance with one or more embodiments of the present disclosure.

In embodiments, the projector control module 430 may be configured to instruct a projector 100 to project images on a surface wherein the image comprises of text, symbols, or a combination thereof. The text may be user inputted, obtained from memory, and the like. In emergency situations, as illustrated in FIG. 7, a driver may project text onto a surface to obtain assistance from first responders (e.g., EMTs and police). For example, security personnel may use this feature at large events to efficiently convey a message to a large crowd. Similarly, military commanders may address troops on the ground at the location of the vehicle 200 using the projection system. In another example, an artist painting on a large wall may use the projection system to project the image onto the surface they wish to paint and then paint onto the projection area matching the paint colors with the colors projected. One skilled in the art would appreciate that the invention may be implemented in myriad ways and any schematic does not serve to limit its scope nor constrain the manner in which the functionality represented in the processors, memory, modules, interfaces, sensors, and peripherals is implemented.

In embodiments, as illustrated in FIG. 7, if a car accident takes place, the projection system may be initiated automatically based upon the vehicle's 200 accelerometer 370 indicating that the vehicle 200 has been in an accident. If the sensors 300 are able to identify a suitable surface without moving the vehicle, the projection control module 430 may initiate to display information about the accident and the passenger of the vehicle 200 that would be helpful for emergency services. In additional embodiments, if no surface is available or the sensors have been too badly damaged to be used, the projection system may emit a flashing light warning other drivers that an accident has occurred.

FIG. 7 illustrates the vehicle 200 after an accident has taken place. The accelerometer may send information to the projection system indicating that an accident has occurred. In response, one or more sensors 300 may scan the area for a surface and the projector 100 may project information about the accident and the passengers onto the surface to assist first responders. Information displayed by the projector 100 may include the time of the accident, the speed at which the car was going when the accident occurred, the number of passengers in the car during the accident, personal information such as age, height, weight and blood type about the person(s) in the accident, and the like. In embodiments, a QR code may be projected that can be scanned by first responders seeking more information about the accident and those injured. When a suitable surface is not available at the scene of an accident, the projector may emit colored light, or flashing light, into a general (no reflective) space, warning other vehicles that an accident has occurred.

It is herein noted that any and all components of the projection system may communicate with centralized networking infrastructure including a local area network (LAN), a wireless local area network (WLAN), a campus area network (MAN), a metropolitan area network (MAN), or a wide area network (WAN), the Internet, any combination thereof and any other type of network that serves a similar purpose including decentralized networks. The server and the projection system may communicate with each over the network through one more standardized networking protocols, including for example, the Internet Protocol (IP), Address Resolution Protocol (ARP), the Transmission Control Protocol (TCP), the User Datagram Protocol (UDP), Hypertext Transfer Protocol Secure (HTTPS), Dynamic Host Configuration Protocol (DHCP), Spanning Tree Protocol (STP), File Transfer Protocol (FTP), Secure File Transfer Protocol (SFTP), Network Time Protocol (NTP), Secure Copy Protocol (SCP), Secure Shell (SSH), Domain Name System (DNS), Internet Message Access Protocol (IMAP), and other network protocols known in the art. One skilled in the art would recognize that other means for data communication may also be employed, including cellular networks and a public switched telephone network ("PSTN"). In embodiments, a user device may communicate with the server via a network or through a GUI touch screen on dashboard 420 directly via Bluetooth, cellular, WIFI or similar means, or the touchscreen may communicate through these means without a user device.

In embodiments, a remote (cloud based) server may maintain and manage certain databases that are accessible by the projection system—namely the remote surface database and the remote content database. The content database contains audiovisual content such as movies and tv shows that may be downloaded to the projection system and projected by the projector 100. The content database may also contain data obtained from or relating to users (e.g., name, address, telephone, date of birth, user name, password, device, order history, device information including MAC address, location data, user preferences, biometric data, etc.) and his or her use of the projector system, including for example, his or her history of purchased or accessed content, (e.g., sales, payments, pricing, etc.) provided through the projection system. The user may access and watch content from other content databases such as Netflix, HBO Max, Apple+, Youtube, YoutubeTV Hulu, Peacock, Paramount, Amazon Prime and any other streaming service.

In embodiments, the remote surface database includes information about all known surfaces, both suitable surfaces and unsuitable surfaces, that have been discovered by the plurality of sensors 300 of the projection system. Every suitable surface in the database includes its Name, its GPS location, the ideal GPS location of a car projecting onto the surface, the size of the surface, its color, its dimensions, its orientation in relation to the ground (height, angle, etc.), the number of times it has been used, the reviews it has received by users who have previously used it, comments from previous users, photos, whether there is a battery charging station at the projection location, whether it is currently in use by another user of the projection system, its current distance from the user's vehicle 200 and an estimate of the time it would take for the user's vehicle 200 to drive to the surface.

In embodiments, every unsuitable surface in the remote surface database may include the same information as suitable surfaces, but may not include user reviews, names, and the reason why the surface is not suitable for projection. For example, if the surface contains an advertisement, the car projection system will monitor the advertisement and update the surface database when changes occur to the advertisement. Typically, such changes indicate that the advertisement has been defaced or weathered to the point that it is no longer of use to the advertising company. In this case such information may be used to notify interested parties. If a surface is unsuitable because it is a color that does not effectively reflect light from the projector, that information may be used by interested parties to repaint the area so that it may be used as a suitable surface, or for public art.

In additional embodiments, another portion of the remote surface database may maintain detailed information and specifications on vehicle projectors 100 and their use at each suitable surface (e.g., model, description, luminescence, location of car when used on surface, purchase date, uses, maximum size at surface location, time used, rating, reviews, technical information, use locations, etc.). In the aggregate, this information may inform the settings of the projector 100, the location of the vehicle 200 during a projection, and ultimately help match projector 100 to the best nearby surface for that projector.

In further embodiments, a portion of the remote surface database may include a log database that maintains detailed information relating to activity for each use of the projector 100 or surface, including, for example, reservations, cancellations, schedules, user transactions, discarded content, reviews, ratings, alarms, warnings, periodic sensor data readings, turning on or off the screen, entering or exiting sleep mode, maintenance work, and any other event or occurrence that relates to the operation of the projector 100, any component therein, or any communication with a user device or other third-party device.

In embodiments, computer 410 may include one or more memory units and one or more processor units. The memory may include any storage medium known in the art suitable for storing program instructions executable by the associated one or more processors. For example, memory may include high-speed random-access memory and/or non-volatile memory, such as one or more magnetic disk storage devices, one or more optical storage devices, and/or flash memory (e.g., NAND, NOR). Memory may store an operating system, such as Darwin, RTXC, LINUX, UNIX, OS X, WINDOWS, or an embedded operating system such as VxWorks. An operating system may include instructions for handling basic system services and for performing hardware dependent tasks. In some implementations, an operating system can include a kernel (e.g., UNIX kernel).

Memory may also store instructions to facilitate communicating with additional devices, computers and/or servers. Memory can also include instructions for a graphical user interface ("GUI") to facilitate graphic user interface processing; instructions for sensor processing to facilitate sensor-related processing and functions; instructions for telephony to facilitate phone-related processes and functions; instructions for electronic messaging to facilitate electronic-messaging related processes and functions; instructions for web browsing to facilitate web browsing-related processes and functions; instructions for media processing to facilitate media processing-related processes and functions; instructions for GPS/Navigation instructions to facilitate GPS/navigation-related processes; and instructions for camera and video processing to facilitate camera-related processes and functions.

The memory may also store other software instructions (not shown), such as security instructions, web video instructions to facilitate web video-related processes and functions, and/or web-shopping instructions to facilitate web shopping-related processes and functions. In some implementations, the media processing instructions are divided into audio processing instructions and video processing instructions to facilitate audio processing-related processes and functions and video processing-related processes and functions, respectively. An activation record and International Mobile Equipment Identity (IMEI) or similar hardware identifier may also be stored in memory. Memory may also include other instructions that facilitate the implementation of any functionality in any embodiment of the invention.

Each of the above identified instructions and applications can correspond to a set of instructions for performing one or more functions described above. These instructions need not be implemented as separate software programs, procedures, or modules. Memory may include additional instructions or fewer instructions. Furthermore, various functions of the mobile device may be implemented in hardware and/or in software, including in one or more signal processing and/or application specific integrated circuits. The disclosed subject matter may be implemented via hardware, software or any combination thereof.

In embodiments, the computer 410 includes or communicates with the battery 500 to track energy production, manage its availability, and optimize its usage. The present invention is designed to be powered from a rechargeable battery 500 housed inside the vehicle 200, but in alternative embodiments, the electrical power may come from any of a variety of sources including solar energy, wind energy, batteries, utility-provided electricity, a gas engine, or any combination thereof.

In embodiments, the computer 410 may monitor the available energy. It also may manage the recharging, changing, and consumption of energy from power supplies. For example, if the power available falls below a certain point, the computer will alert the user that the supply is low, including where applicable, a warning that the selected content cannot be played in its entirety with the current power available. The computer 410 may also run instructions and functions relating to entering sleep mode due to inactivity.

In embodiments, the computer 410 may be configured to execute instructions and functions that evaluate data received from one or more sensors 300 to identify emergencies or assess threats to the system or any component thereof. The computer 410 may execute instructions using one or more processors. For example, the computer 410 may monitor data obtained from at least one or more sensors 300 (such as a video recording, LIDAR, RADAR or any combination thereof) to identify physical threats to the projector system and/or any property in its vicinity. In the event that a person seeks to vandalize or access such property without authorization, the control module may execute instructions to alert the appropriate people, including for example, the user of the projector system or the local authorities.

In embodiments, the computer 410 may further execute instructions and functions that set of security alarms (e.g., flashing lights, audio alarms), instruct the video camera to obtain images of the perpetuator and their vehicle (including the license plate number) if he or she or they attempt to leave the scene in a car. The computer 410 may also be adapted to execute instructions and functions to notify emergency responders of an emergency.

In embodiments the computer 410 may include any and all of the control modules 430, 440 and 450 and operate all of their processes via one or more processors configured to execute one or more sets of instructions or software programs.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A vehicle projection system, comprising:
a vehicle, wherein the vehicle is at least one of a car, truck, camper, bus, motorcycle, or military transport vehicle, the vehicle including a controller and a plurality of sensors, the plurality of sensors being operatively associated with the vehicle, the controller receives data from the plurality of sensors and configured to autonomously drive the vehicle, the plurality of sensors include of a radio detection and ranging sensor, a light detection and ranging sensor, and a global positioning system sensor; and
a projector, the projector being in proximity with the vehicle, wherein the controller receives the data from the plurality of sensors and to identify at least one surface suitable to accurately reflect a light source from the projector, wherein a location of the at least one surface suitable to accurately reflect a light source from the projector is stored and retrievable by user input, the location including a longitude and latitude.

2. The vehicle projection system of claim 1, wherein the plurality of sensors identifies at least one surface which is flat or evenly shaped.

3. The vehicle projection system of claim 1, wherein the plurality of sensors identifies at least one surface that reflects light with minimal distortion.

4. The vehicle projection system of claim 1, wherein the controller is configured to autonomously drive the vehicle to an appropriate location for the at least one surface suitable to accurately reflect a light source from the projector.

5. The vehicle projection system of claim 4, wherein the controller adjusts controls of the projector so that the visual content emitted from the projector is accurately reflected on the at least one surface when the vehicle is placed in the appropriate location.

6. The vehicle projection system of claim 1, wherein the at least one surface is a color which is non-black.

7. A vehicle projection system, comprising:
a vehicle, wherein the vehicle is at least one of a car, truck, camper, bus, motorcycle, or military transport vehicle, the vehicle including a controller and a plurality of sensors, the plurality of sensors being operatively associated with the vehicle, the controller receives data from the plurality of sensors and configured to autonomously drive the vehicle; and
a projector, the projector being in proximity with the vehicle, wherein the controller receives the data from the plurality of sensors and to identify at least one surface suitable to accurately reflect a light source from the projector, wherein the plurality of sensors includes at least one of a radio detection and ranging sensor, a light detection and ranging sensor, and a global positioning system sensor, the plurality of sensors identifies at least one surface which is flat or evenly shaped, wherein a location of the at least one surface suitable to accurately reflect a light source from the projector is stored and retrievable by user input, the location including a longitude and latitude.

8. The vehicle projection system of claim 7, wherein the plurality of sensors identifies at least one surface that reflects light with minimal distortion.

9. The vehicle projection system of claim 7, wherein the controller is configured to autonomously drive the vehicle to an appropriate location for the at least one surface suitable to accurately reflect a light source from the projector.

10. The vehicle projection system of claim 9, wherein the controller adjusts controls of the projector so that the visual content emitted from the projector is accurately reflected on the at least one surface when the vehicle is placed in the appropriate location.

11. The vehicle projection system of claim 7, wherein the at least one surface is a color which is non-black.

* * * * *